United States Patent
Kantor et al.

(10) Patent No.: US 8,254,698 B2
(45) Date of Patent: Aug. 28, 2012

(54) METHODS FOR DOCUMENT-TO-TEMPLATE MATCHING FOR DATA-LEAK PREVENTION

(75) Inventors: Alon Kantor, Tel Aviv (IL); Liran Antebi, Kfar Harif (IL); Yoav Kirsch, Macabim (IL); Uri Bialik, Ramat Efal (IL)

(73) Assignee: Check Point Software Technologies Ltd, Tel Aviv (IL)

( * ) Notice: Subject to any disclaimer, the term of this patent is extended or adjusted under 35 U.S.C. 154(b) by 818 days.

(21) Appl. No.: 12/417,030

(22) Filed: Apr. 2, 2009

(65) Prior Publication Data

US 2010/0254615 A1    Oct. 7, 2010

(51) Int. Cl.
   *G06K 9/62* (2006.01)
   *G06K 9/64* (2006.01)
   *G06K 9/68* (2006.01)
   *G06F 7/00* (2006.01)
   *G06F 17/30* (2006.01)
   *G06F 11/00* (2006.01)
(52) U.S. Cl. ........ 382/209; 382/112; 382/217; 382/218; 382/220; 707/747; 726/22; 726/32
(58) Field of Classification Search .......... 382/112, 382/209, 217, 218, 220; 707/747; 711/216; 726/22, 32
See application file for complete search history.

(56) References Cited

U.S. PATENT DOCUMENTS

| | | | | |
|---|---|---|---|---|
| 5,778,363 A | * | 7/1998 | Light | 1/1 |
| 5,842,217 A | * | 11/1998 | Light | 1/1 |
| 5,982,893 A | * | 11/1999 | Hughes | 705/75 |
| 6,240,409 B1 | | 5/2001 | Aiken | |
| 7,454,778 B2 | * | 11/2008 | Pearson et al. | 726/1 |
| 2005/0060643 A1 | | 3/2005 | Glass et al. | |
| 2010/0095377 A1 | * | 4/2010 | Krywaniuk | 726/22 |

OTHER PUBLICATIONS

Equivio>NearDuplicates product page from Equivio, www.equivio.com, 2009.
Digital Asset Security™ module product page from Proofpoint, www.proofpoint.com, 2009.
PreciseID fingerprinting technology white paper from Websense, www.websense.com/docs/WhitePapers/PA_Information_Identification_Fingerprinting.pdf, 2008.

* cited by examiner

*Primary Examiner* — John Strege
(74) *Attorney, Agent, or Firm* — Mark M Friedman

(57) ABSTRACT

The present invention discloses methods for document-to-template matching for data-leak prevention (DLP), the methods including the steps of: providing a document as a stream of characters; splitting the stream into a plurality of serialized data lines; calculating a hash value for each serialized data line; checking for each hash value in a hash map of a template set; determining a similarity match to a particular template based on a predefined threshold of template hash values, of the template set, being found in the stream; and based on the similarity match, executing a DLP security policy for the document. Preferably, the template set is extracted from documents manually prepared by a security administrator. Preferably, each template in the template set is deduced automatically from a plurality of documents.

20 Claims, 2 Drawing Sheets

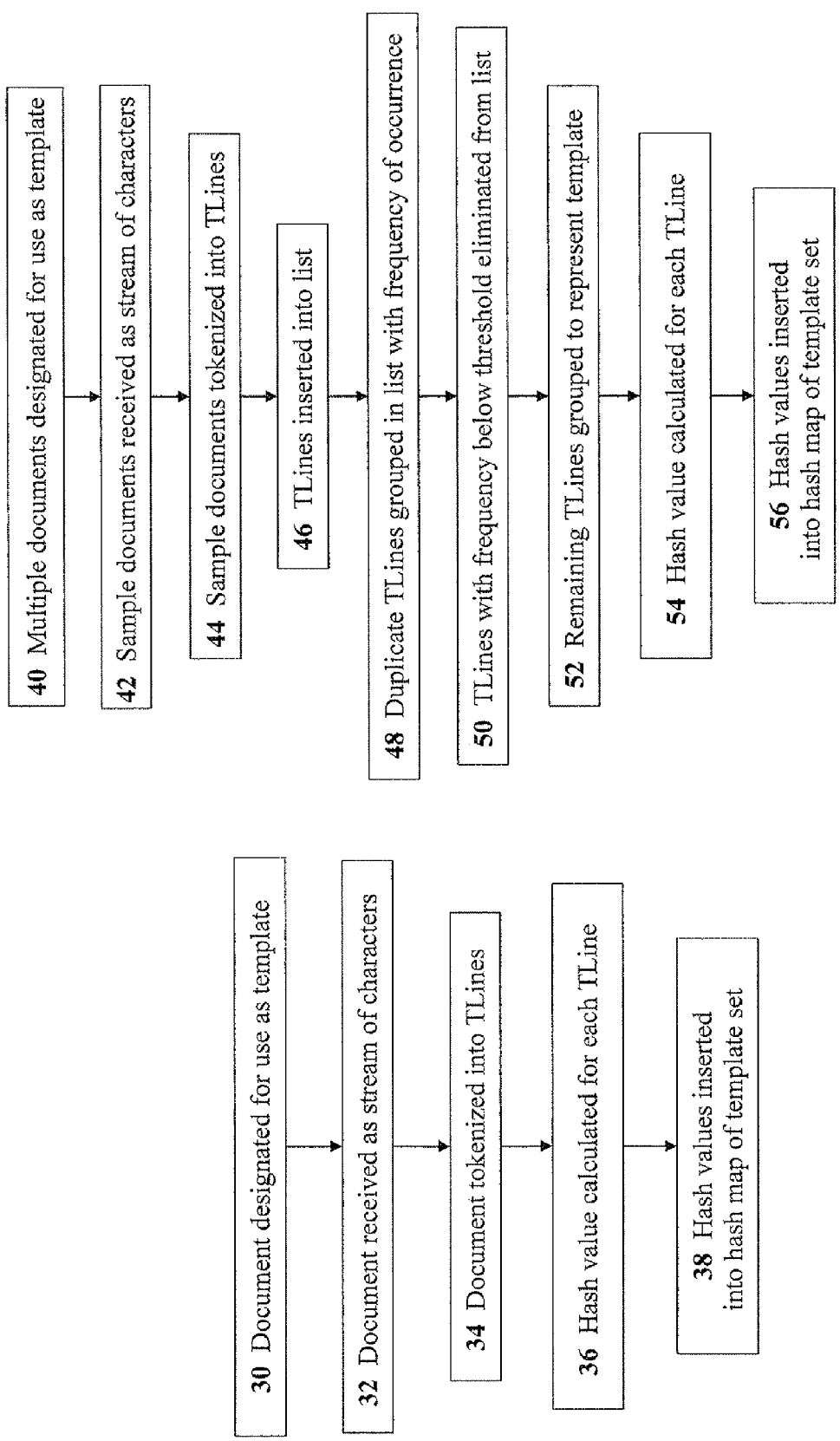

METHODS FOR DOCUMENT-TO-TEMPLATE MATCHING FOR DATA-LEAK PREVENTION

FIELD AND BACKGROUND OF THE INVENTION

The present invention relates to methods for document-to-template matching for Data-Leak Prevention (DLP, also referred to as Data-Loss Prevention).

Protecting corporate intellectual property has become a major concern for many IT (information technology) departments. Organizations are concerned with protecting patents, trademarks, brands, copyrights, trade secrets, and other corporate assets. Today, most corporate information exists in electronic form, potentially accessible to almost any employee. Furthermore, the use of e-mail has become a ubiquitous aspect of retaining such information, making the control of document transmission and distribution even more imperative. Accidental (or intentional) disclosure of confidential information can result in legal damages and/or loss of competitive edge for a company.

The problems facing DLP impose a challenge with regard to how exactly to classify and identify outbound documents. The methods which are used today involve brute-force fingerprinting of the whole corporate data in order to classify each document. The problems with such methods include the following.

(1) The data needs to be stored in a central database. The process of storing and maintaining a large amount of information is time-consuming. This also creates situations in which restricted data can be exposed en masse to internal personnel.
(2) New documents that do not pass through such a fingerprinting mechanism can still be distributed while not being properly classified as a sensitive document.
(3) For security reasons, some corporate documents may not be accessible to such a fingerprinting mechanism which imposes another security vulnerability to such methods.

Various DLP solutions in the prior art perform aspects of file and paragraph fingerprinting for preventing internal data leakage. Equivio Inc., Kensington, Md., provides an Equivio>NearDuplicates product which detects and groups near-duplicate files, mainly in order to reduce storage usage. The Equivio product relies on algorithms that look for the number of sequential word pairs.

Proofpoint Inc., Sunnyvale, Calif., provides a Digital Asset Security™ module for enabling multiple category document protection: Categories can be defined for different types of documents to secure, each with different access controls and properties. For example, one can create separate categories for internal memos, draft press releases, organizational charts, and price lists. Each category can have its own properties (such as default time after which documents expire) and document similarity-matching thresholds.

Websense Inc., San Diego, Calif., provides a PreciseID™ fingerprinting technology, using a template/boilerplate fingerprint, that improves the accuracy of detection by accounting for false similarity and screens out commonly-recurring text in similar documents, including boiler plates, disclaimers, template descriptions, forms, and contract terms. The technology employs filters to account for "templated" content for reducing false positives associated with basic identification techniques, which often stumble over templated content. This technology only uses document templates to exclude content from being tagged as a data leak.

Glass et al., in US Patent Publication No. 20050060643, discloses a document similarity detection and classification system for spam detection. The system involves manual annotation of "chunks" of a document to point out the salient ones.

Aiken, in U.S. Pat. No. 6,240,409, mentions a method based on a procedure known as document fingerprinting. Fingerprinting a document involves computing hashes of selected substrings in a document. A particular set of substring hashes chosen to represent a document is the documents fingerprint. The similarity of two documents is defined as a ratio C/T where C is the number of hashes the two documents have in common and T is the total number of hashes taken of one of the documents. Assuming a well-behaved hash function, this ratio is a good estimate of the actual percentage overlap between the two documents. However, this also assumes that a sufficient number of substring hashes are used. Various approaches have been used in determining which substrings in a document are selected for hashing and which of these substring hashes are saved as part of the document fingerprint.

It would be desirable to have methods for document-to-template matching for DLP. Such methods would, among other things, overcome the limitations of the prior art mentioned above.

SUMMARY OF THE INVENTION

It is the purpose of the present invention to provide methods for document-to-template matching for DLP.

In the interest of clarity, several terms which follow are specifically defined for use herein. The term "template" is used herein to refer to a "skeleton/father" document. Some examples of a template include, but are not limited to: a corporate employee contract, an expense report, and an annual report. The terms "tokenizing," "tokenization," and "tokenized" are used herein to refer to a process of splitting a document into serialized lines of data which are easy to use later for hashing and comparison. The term "TLines" is used herein to refer to the serialized lines of data that result from tokenizing a document.

Preferred embodiments of the present invention teach an automatic method for classifying documents based on their relation to a template. Such an approach solves the problems imposed by the fingerprinting methods described above by:

(1) storing only the template in a centralized database, as opposed to large quantities of documents; and
(2) preventing documents from being distributed without authorization while matching the template, since no fingerprinting is done on a per-document basis.

Preferred embodiments of the present invention are used to determine the degree of similarity between a document and a template with high accuracy. In order to support many templates, a special algorithm is employed which enables a single document to be matched to multiple templates in real time, independent of the number of templates.

Therefore, according to the present invention, there is provided for the first time a method for document-to-template matching for data-leak prevention (DLP), the method including the steps of: (a) providing a document as a stream of characters; (b) splitting the stream into a plurality of serialized data lines; (c) calculating a hash value for each serialized data line; (d) checking for each hash value in a hash map of a template set; (e) determining a similarity match to a particular template based on a predefined threshold of template hash values, of the template set, being found in the stream; and (f) based on the similarity match, executing a DLP security policy for the document.

Preferably, the DLP security policy includes at least one of the enforcement actions selected from the group consisting of: quarantining the document, blocking the document from being transmitted, releasing the document for transmission only upon administrator approval, notifying an intended recipient of a document status of the document, requesting additional user credentials in order to allow transmission of the document, and applying an encryption protocol for securely transmitting the document.

Preferably, the template set is extracted from documents manually prepared by a security administrator.

Preferably, each template in the template set is deduced automatically from a plurality of documents.

According to the present invention, there is provided for the first time a method for document-to-template matching by designating multiple documents for use as a template for data-leak prevention (DLP), the method including the steps of: (a) providing a plurality of documents as a stream of characters; (b) splitting the stream into a plurality of serialized data lines; (c) inserting the plurality of serialized data lines into a list; (d) grouping duplicate serialized data lines in the list with an indication of a frequency of occurrence for each serialized data line in the stream; (e) eliminating serialized data lines having a threshold frequency below a predefined threshold from the list; (f) grouping remaining serialized data lines to represent the template; (g) calculating a hash value for each serialized data line in the template; (h) inserting each hash value into a hash map of a template set; (i) checking for hash values of a new document in the hash map; (j) determining a similarity match to a particular template based on a predefined threshold of template hash values, of the template set, being found in the new document; and (k) based on the similarity match, executing a DLP security policy for the new document.

Preferably, the DLP security policy includes at least one of the enforcement actions selected from the group consisting of: quarantining the new document, blocking the new document from being transmitted, releasing the new document for transmission only upon administrator approval, notifying an intended recipient of a document status of the new document, requesting additional user credentials in order to allow transmission of the new document, and applying an encryption protocol for securely transmitting the new document.

Preferably, the template set is extracted from documents manually prepared by a security administrator.

Preferably, each template in the template set is deduced automatically from a plurality of documents.

According to the present invention, there is provided for the first time a computer-readable storage medium having computer-readable code embodied on the computer-readable storage medium, the computer-readable code including: (a) program code for providing a document as a stream of characters; (b) program code for splitting the stream into a plurality of serialized data lines; (c) program code for calculating a hash value for each serialized data line; (d) program code for checking for each hash value in a hash map of a template set; (e) program code for determining a similarity match to a particular template based on a predefined threshold of template hash values, of the template set, being found in the stream; and (f) program code for, based on the similarity match, executing a security policy for the document.

Preferably, the security policy includes at least one of the enforcement actions selected from the group consisting of: quarantining the document, blocking the document from being transmitted, releasing the document for transmission only upon administrator approval, notifying an intended recipient of a document status of the document, requesting additional user credentials in order to allow transmission of the document, and applying an encryption protocol for securely transmitting the document.

Preferably, the template set is extracted from documents manually prepared by a security administrator.

Preferably, each template in the template set is deduced automatically from a plurality of documents.

According to the present invention, there is provided for the first time a computer-readable storage medium having computer-readable code embodied on the computer-readable storage medium, the computer-readable code including: (a) program code for providing a plurality of documents as a stream of characters; (b) program code for splitting the stream into a plurality of serialized data lines; (c) program code for inserting the plurality of serialized data lines into a list; (d) program code for grouping duplicate serialized data lines in the list with an indication of a frequency of occurrence for each serialized data line in the stream; (e) program code for eliminating serialized data lines having a threshold frequency below a predefined threshold from the list; (f) program code for grouping remaining serialized data lines to represent the template; (g) program code for calculating a hash value for each serialized data line in the template; (h) program code for inserting each hash value into a hash map of a template set; (i) program code for checking for hash values of a new document in the hash map; (j) program code for determining a similarity match to a particular template based on a predefined threshold of template hash values, of the template set, being found in the new document; and (k) program code for, based on the similarity match, executing a security policy for the new document.

Preferably, the security policy includes at least one of the enforcement actions selected from the group consisting of: quarantining the new document, blocking the new document from being transmitted, releasing the new document for transmission only upon administrator approval, notifying an intended recipient of a document status of the new document, requesting additional user credentials in order to allow transmission of the new document, and applying an encryption protocol for securely transmitting the new document.

Preferably, the template set is extracted from documents manually prepared by a security administrator.

Preferably, each template in the template set is deduced automatically from a plurality of documents.

These and further embodiments will be apparent from the detailed description and examples that follow.

BRIEF DESCRIPTION OF THE DRAWINGS

The present invention is herein described, by way of example only, with reference to the accompanying drawing, wherein:

FIG. 2A is a simplified flowchart of the major operational steps for designating direct templates for document-to-template matching, according to preferred embodiments of the present invention;

FIG. 2B is a simplified flowchart of the major operational steps for designating by-example templates for document-to-template matching, according to preferred embodiments of the present invention.

DESCRIPTION OF THE PREFERRED EMBODIMENTS

Figure 1:
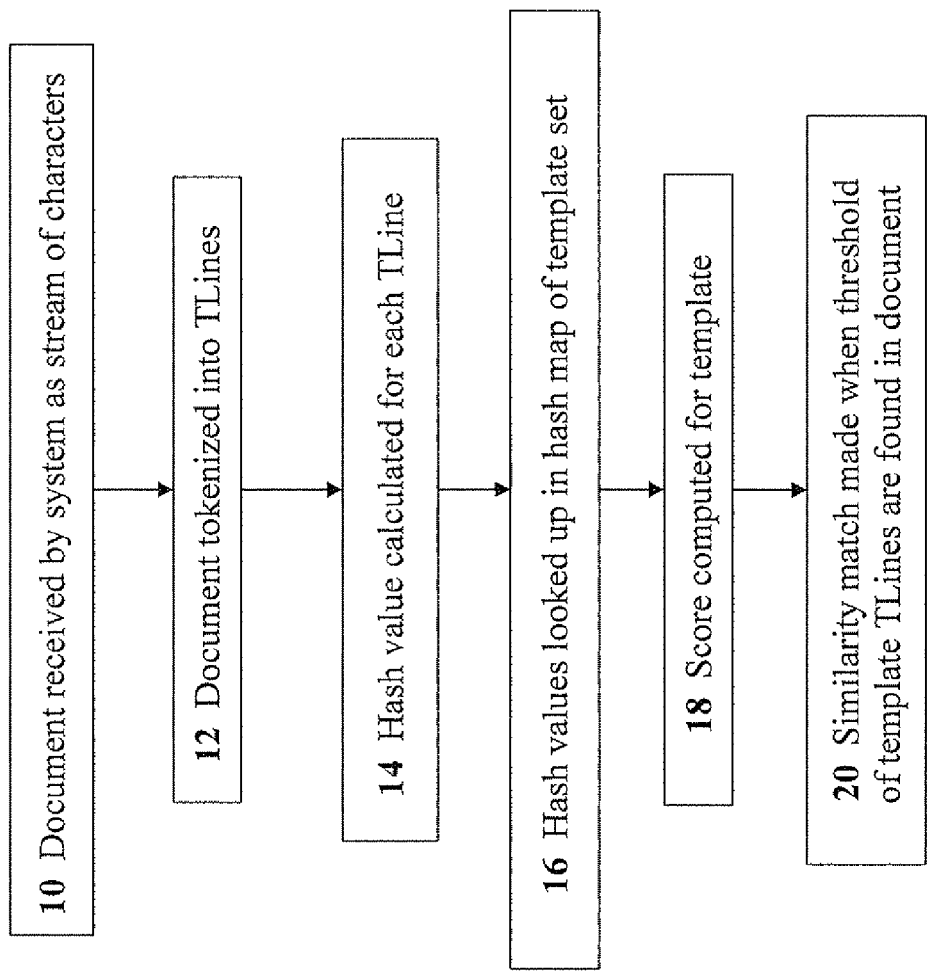
FIG. 1 is a simplified flowchart of the major operational steps for document-to-template matching, according to preferred embodiments of the present invention.

The present invention relates to methods for document-to-template matching for DLP. The principles and operation for document-to-template matching, according to the present invention, may be better understood with reference to the accompanying description and the drawing.

Each document/template is represented as a stream of readable characters. It is assumed that other pre-processing applications have already extracted a stream of characters from the document regardless of its enclosing format (e.g. a Word document, a PowerPoint presentation, and a PDF document). The output of the algorithm is a number which represents the similarity level of the document to the template(s). A threshold is used in order to determine whether a document belongs to each particular template.

Each document, whether it is a template or a regular document, is passed through an initial "tokenizing" step. The purpose of the "tokenization" is to split the document into serialized lines of data which are easy to use later for hashing and comparison. It is important to have a correct splitting of the document into pieces which will be identical both in the template and in all derived documents. If the splitting creates lines which are too long, then chances are that no identical lines will be found. If the splitting creates lines which are too short, then too many identical lines will be found, making it difficult to determine whether a document which matches a template is really a document which belongs to that template. These serialized lines are referred to as TLines. A document is split into TLines as follows.

(1) Each new-line designation creates a new TLine.
(2) Any punctuation symbol creates a new TLine.
(3) All numbers are ignored. A sentence that contains a number is broken before and after each number.

For each TLine, a hash value is calculated to be inserted into a hash map. The hash function typically returns a 32-bit value.

Each document is compared to a set of templates. In preferred embodiments, there are two ways for the user to provide the templates: "direct" and "by-example." In the direct way, the user supplies each template "as is" (i.e. as a template document which will be used for matching). The by-example way creates a single template out of several sample documents (given as a stream of characters). A by-example template is constructed out of several sample documents in the following way.

(1) Each sample document (given as a stream of characters) is tokenized, and TLines are created.
(2) For all sample documents, each TLine is inserted into a list. Duplicate TLines are counted.
(3) After all sample documents are processed, a list is generated of all TLines with a count of how many times each TLine was encountered.
(4) Using a predefined threshold number (e.g. 60%, denoting the percentage of input documents containing this TLine), all TLines which are below the threshold are eliminated.
(5) The TLines that remain (i.e. above the threshold) are grouped together in order to represent the new template.

All the templates are stored in a data structure which maps a TLine hash to a <FID, CLINE> pair where FID is a template identifier and TLINE is the TLINE index inside the template. When a template is loaded, first the template is tokenized, and then each TLine is hashed. The hashed TLines are then inserted to the hash map.

When a document is examined, first the document is tokenized, and then each TLine is hashed. The hashed TLines are then looked up in the hash map. For each document, the process sequence is as follows.

(1) Tokenize the document into TLines and hash each TLine.
(2) Locate the TLine in the hash map of all templates. A fast hash lookup is initially performed.
(3) A document matches a template if the document contains more than a threshold of total TLines in the template (e.g. good results can be obtained when the threshold is set to 70%). The threshold can be refined for each template to achieve better results.

Using a global hash map, a matching-algorithm output for multiple templates, O(N), is produced, where N is the number of TLines in the document. A global hash map is used in order to store all template TLines. The final score for each document is calculated for each template to be: $S_t = M_t / T_t$, where $S_t$ is the final score for each template identity for the current document, $M_t$ is number of matches found while searching the global hash map for this template, and $T_t$ is the total number of TLines in the template. The template with the highest score is selected out of all templates that pass the 70% threshold.

Referring now to the drawing, FIG. 1 is a simplified flowchart of the major operational steps for document-to-template matching, according to preferred embodiments of the present invention. The process starts when a document is received by the system as a stream of characters (Step 10), and tokenized into TLines as described above (Step 12). A hash value is calculated for each TLine (Step 14), and then the hash values are looked up in a hash map of the template set (Step 16). The designation of templates is described below with regard to FIGS. 2A-B. A score, $S_t$, is computed for the template as described above (Step 18). A document-to-template similarity match is made when a predefined threshold of template TLines are found in the document (Step 20).

FIG. 2A is a simplified flowchart of the major operational steps for designating direct templates for document-to-template matching, according to preferred embodiments of the present invention. The process starts with a document being designated for use as a template (Step 30). The document is received as a stream of characters (Step 32), and tokenized into TLines as described above (Step 34). A hash value is calculated for each TLine (Step 36), and then the hash values are inserted into a hash map of the template set (Step 38).

FIG. 2B is a simplified flowchart of the major operational steps for designating by-example templates for document-to-template matching, according to preferred embodiments of the present invention. The process starts with multiple documents being designated for use as a template (Step 40). The sample documents are received as a stream of characters (Step 42), and tokenized into TLines as described above (Step 44). The TLines are inserted into a list (Step 46). Duplicate TLines are grouped in the list with an indication of the frequency of occurrence for each TLine in the sample documents (Step 48). TLines with a frequency below a predefined threshold are eliminated from the list (Step 50). The remaining TLines are grouped to represent the template (Step 52). A hash value is calculated for each TLine in the template (Step 54), and then the hash values are inserted into a hash map of the template set (Step 56).

While the invention has been described with respect to a limited number of embodiments, it will be appreciated that many variations, modifications, and other applications of the invention may be made.

What is claimed is:

1. A method for document-to-template matching for data-leak prevention (DLP), the method comprising the steps of:
   (a) providing a document as a stream of characters;
   (b) splitting said stream into a plurality of non-overlapping serialized data lines, with each said serialized data line including at least two side characters;
   (c) calculating a hash value for each said serialized data line;
   (d) checking for each said hash value in a hash map of a template set;
   (e) determining a similarity match to a particular template based on a predefined threshold of template hash values, of said template set, being found in said stream; and
   (f) based on said similarity match, executing a DLP security policy for said document.

2. The method of claim 1, wherein said DLP security policy includes at least one of the enforcement actions selected from the group consisting of: quarantining said document, blocking said document from being transmitted, and releasing said document for transmission only upon administrator approval.

3. The method of claim 1, wherein said template set is extracted from documents manually prepared by a security administrator.

4. The method of claim 1, wherein each template in said template set is deduced automatically from a plurality of documents.

5. A method for document-to-template matching by designating multiple documents for use as a template for data-leak prevention (DLP), the method comprising the steps of:
   (a) providing a plurality of documents as a stream of characters;
   (b) splitting said stream into a plurality of serialized data lines;
   (c) inserting said plurality of serialized data lines into a list;
   (d) grouping duplicate serialized data lines in said list with an indication of a frequency of occurrence for each said serialized data line in said stream;
   (e) eliminating serialized data lines having a threshold frequency below a predefined threshold from said list;
   (f) grouping remaining serialized data lines to represent the template;
   (g) calculating a hash value for each said serialized data line in the template;
   (h) inserting each said hash value into a hash map of a template set;
   (i) checking for hash values of a new document in said hash map;
   (j) determining a similarity match to a particular template based on a predefined threshold of template hash values, of said template set, being found in said new document; and
   (k) based on said similarity match, executing a DLP security policy for said new document.

6. The method of claim 5, wherein said DLP security policy includes at least one of the enforcement actions selected from the group consisting of: quarantining said new document, blocking said new document from being transmitted, releasing said new document for transmission only upon administrator approval, notifying an intended recipient of a document status of said new document, requesting additional user credentials in order to allow transmission of said new document, and applying an encryption protocol for securely transmitting said new document.

7. The method of claim 5, wherein said template set is extracted from documents manually prepared by a security administrator.

8. A computer-readable storage medium having computer-readable code embodied on the computer-readable storage medium, the computer-readable code comprising:
   (a) program code for providing a document as a stream of characters;
   (b) program code for splitting said stream into only a plurality of non-overlapping serialized data lines, with each said serialized data line including at least two said characters;
   (c) program code for calculating a hash value for each said serialized data line;
   (d) program code for checking for each said hash value in a hash map of a template set;
   (e) program code for determining a similarity match to a particular template based on a predefined threshold of template hash values, of said template set, being found in said stream; and
   (f) program code for, based on said similarity match, executing a security policy for said document.

9. The storage medium of claim 8, wherein said security policy includes at least one of the enforcement actions selected from the group consisting of: quarantining said document, blocking said document from being transmitted, and releasing said document for transmission only upon administrator approval.

10. The storage medium of claim 8, wherein said template set is extracted from documents manually prepared by a security administrator.

11. The storage medium of claim 8, wherein each template in said template set is deduced automatically from a plurality of documents.

12. A computer-readable storage medium having computer-readable code embodied on the computer-readable storage medium, the computer-readable code comprising:
   (a) program code for providing a plurality of documents as a stream of characters;
   (b) program code for splitting said stream into a plurality of serialized data lines;
   (c) program code for inserting said plurality of serialized data lines into a list;
   (d) program code for grouping duplicate serialized data lines in said list with an indication of a frequency of occurrence for each said serialized data line in said stream;
   (e) program code for eliminating serialized data lines having a threshold frequency below a predefined threshold from said list;
   (f) program code for grouping remaining serialized data lines to represent the template;
   (g) program code for calculating a hash value for each said serialized data line in the template;
   (h) program code for inserting each said hash value into a hash map of a template set;
   (i) program code for checking for hash values of a new document in said hash map;
   (j) program code for determining a similarity match to a particular template based on a predefined threshold of template hash values, of said template set, being found in said new document; and
   (k) program code for, based on said similarity match, executing a security policy for said new document.

13. The storage medium of claim 12, wherein said security policy includes at least one of the enforcement actions selected from the group consisting of: quarantining said new document, blocking said new document from being transmitted, releasing said new document for transmission only upon administrator approval, notifying an intended recipient of a document status of said new document, requesting additional user credentials in order to allow transmission of said new document, and applying an encryption protocol for securely transmitting said new document.

14. The storage medium of claim 12, wherein said template set is extracted from documents manually prepared by a security administrator.

15. The method of claim 1, wherein said DLP security policy includes notifying an intended recipient of a document status of said document.

16. The method of claim 1, wherein said DLP security policy includes requesting additional user credentials in order to allow transmission of said document.

17. The method of claim 1, wherein said DLP security policy includes applying an encryption protocol for securely transmitting said document.

18. The storage medium of claim 8, wherein said security policy includes notifying an intended recipient of a document status of said document.

19. The storage medium of claim 8, wherein said security policy includes requesting additional user credentials in order to allow transmission of said document.

20. The storage medium of claim 8, wherein said security policy includes applying an encryption protocol for securely transmitting said document.

* * * * *